United States Patent

Hack et al.

[11] Patent Number: 5,839,774
[45] Date of Patent: Nov. 24, 1998

[54] ANTI-BUFFET SCREEN DEVICE FOR AN OPEN MOTOR VEHICLE AND METHOD OF MAKING SAME

[75] Inventors: Albert Hack; Wolfgang Odebrecht, both of Sindelfingen, Germany

[73] Assignee: Daimler-Benz Aktiengesellschaft, Stuttgart, Germany

[21] Appl. No.: 5,825

[22] Filed: Jan. 12, 1998

[30] Foreign Application Priority Data

Jan. 11, 1997 [DE] Germany ............... 197 00 739.2

[51] Int. Cl.$^6$ .......................................................... B60J 1/20
[52] U.S. Cl. .............................................. 296/91; 296/180.1
[58] Field of Search .............................. 296/91, 180.1

[56] References Cited

U.S. PATENT DOCUMENTS

| | | | |
|---|---|---|---|
| 5,211,718 | 5/1993 | Götz et al. | 296/180.1 |
| 5,368,356 | 11/1994 | Götz et al. | 296/180.1 |
| 5,707,099 | 1/1998 | Schrader et al. | 296/180.1 |
| 5,738,404 | 4/1998 | Stadler et al. | 296/180.1 |

*Primary Examiner*—Gary C. Hoge
*Attorney, Agent, or Firm*—Evenson McKeown Edwards & Lenahan, PLLC

[57] ABSTRACT

An anti-buffet screen device for an open motor vehicle has associated a heat-transfer device with it, said device extending over at least a portion of its active surface and being made flat, especially a radiator device.

36 Claims, 2 Drawing Sheets

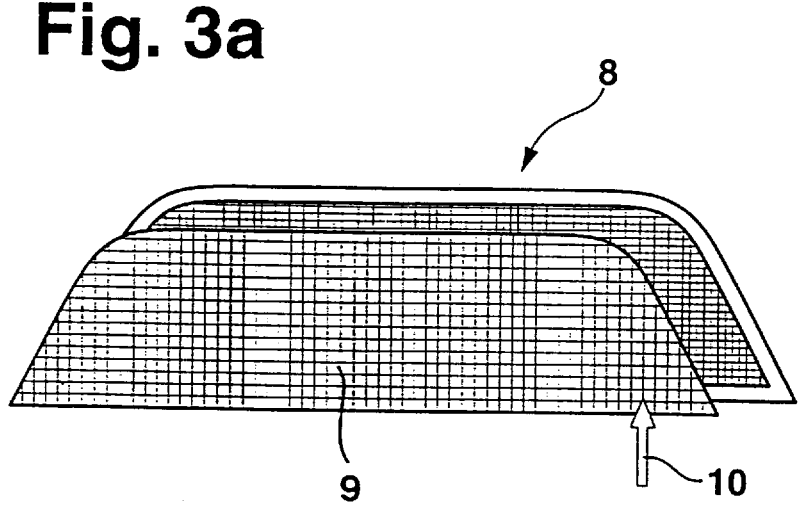
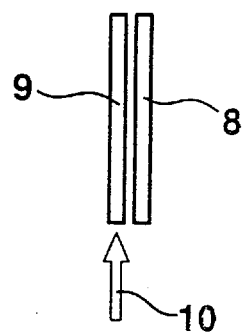
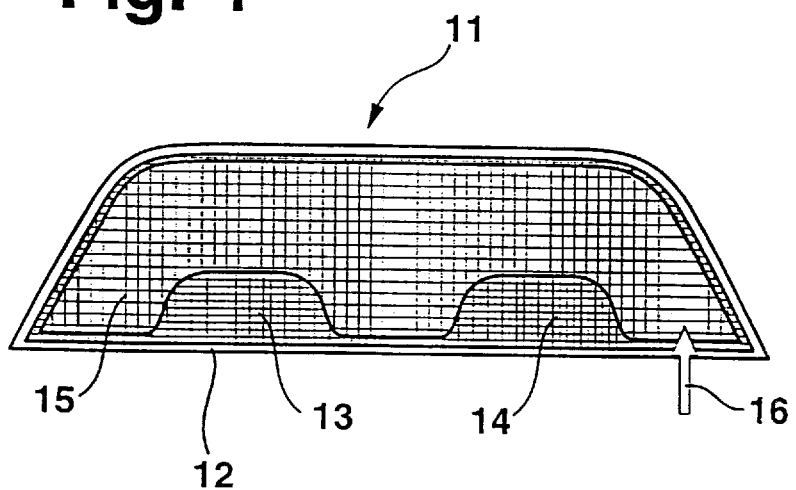

ANTI-BUFFET SCREEN DEVICE FOR AN OPEN MOTOR VEHICLE AND METHOD OF MAKING SAME

BACKGROUND AND SUMMARY OF THE INVENTION

This application claims the priority of German application 197 00 739.2-21 filed in Germany on Jan. 11, 1997, the disclosure of which is expressly incorporated by reference herein.

The invention relates to an anti-buffet screen device for an open motor vehicle with at least one wind buffet screen associated with at least one seat position of a motor vehicle interior.

Open automobiles with convertible tops are generally known. In order to reduce the draft on the vehicle occupants when the convertible top is down, it is also known to equip such convertibles with anti-buffet screen devices that reduce or suppress the reverse flow of air forward into the area occupied by the passengers, said flow being caused by suction generated while driving the convertible.

It is also known from DE 39 25 809 A1 to compensate for the unpleasant draft phenomena by creating additional flow cross sections in the anterior part of the vehicle. As a result, the reverse flow that occurs in the vicinity of the rear of the vehicle is avoided.

A goal of the invention is to provide an anti-buffet screen device for an open motor vehicle of the species recited at the outset that permits air conditioning, i.e. heating or cooling, of the upper area of the passenger compartment with the top down.

This goal is achieved according to preferred embodiments of the invention by virtue of the fact that a flat heat transfer arrangement, especially a radiator arrangement, is associated with the anti-buffet screen, and extends at least over a portion of its active surface.

As a result, according to the invention, the reverse flow of the wind that occurs in any event as the open motor vehicle drives along is utilized, said flow passing through the anti-buffet screen from the rear and being air-conditioned, i.e. cooled or heated according to the invention as it passes through the anti-buffet screen. Heating this reverse flow allows the convertible to be driven with the top down even at low outside temperatures, since the reverse flow guides the heated air into the head and shoulder area of the vehicle occupants. At very high outside temperatures, the solution according to the invention provides suitable cooling in the head and shoulder area, so that even at very high outside temperatures, a pleasant driving sensation is felt when driving with the top down. The solution according to the invention basically requires no additional delivery devices, such as blowers for example, to produce the heating or cooling air stream, since the reverse flow that occurs in any event when driving the motor vehicle with the top down is employed in a simple fashion.

In designing the preferred embodiments of the invention, the heat transfer device is integrated into the anti-buffet screen. In this way it is possible to replace the flat structure of an anti-buffet screen, which is in the form of a net or is otherwise perforated, directly by suitably designed heat transfer surfaces of the heat-transfer device so that the same active surface can serve both for reducing drafts and for air-conditioning the air in the exposed areas of the interior.

In certain preferred embodiments of the invention, the heat transfer device is aligned parallel to the anti-buffet screen and placed against the latter. This makes it possible to retrofit an anti-buffet screen of a convertible with a heat-transfer device of this kind.

In certain preferred embodiments of the invention, the active surface of the heat-transfer device is cut out in the vicinity of the headrests of all the seat positions. This is advantageous since the through flow in the heat transfer devices at the level of the headrests cannot in any event contribute to air-conditioning the head and shoulder areas of the vehicle occupants since the headrests pose obstacles to flow.

In certain preferred embodiments of the invention, the heat-transfer device has an additional blower associated with it, with the flow generated by said blower moving in the direction of the reverse flow generated by the wind when driving, through the anti-buffet screen and the heat transfer device. This additional blower guarantees sufficient through flow through the heat-transfer device, even when driving very slowly or when the vehicle is at rest, so that even in these cases sufficient air-conditioning of the upper part of the passenger compartment is possible.

In certain preferred embodiments of the invention, the radiator device has electrically heatable surfaces. This is an especially simple design since it is merely necessary to supply current from the on-board electrical system.

In certain preferred embodiments of the invention, the heat-transfer device is associated with a control for the heating or cooling power that depends on the driving speed. This ensures that a correspondingly higher heating power can be generated during driving than at rest. Especially in the case of electrical heating, therefore, overloading the on-board electrical system is avoided since the generator action of the alternator is not sufficient to charge the on-board electrical system when the vehicle is at rest.

Other objects, advantages and novel features of the present invention will become apparent from the following detailed description of the invention when considered in conjunction with the accompanying drawings.

BRIEF DESCRIPTION OF THE DRAWINGS

FIG. 2b is a side view of the anti-buffet screen device in FIG. 2a;

FIG. 3a is a schematic front view of another embodiment of an anti-buffet screen device similar to that in FIG. 2a;

FIG. 3b is a side view of the anti-buffet screen device in FIG. 3a; and

FIG. 4 is a schematic front view of another anti-buffet screen device similar to those in FIGS. 2a to 3b.

DETAILED DESCRIPTION OF THE DRAWINGS

Figure 1:
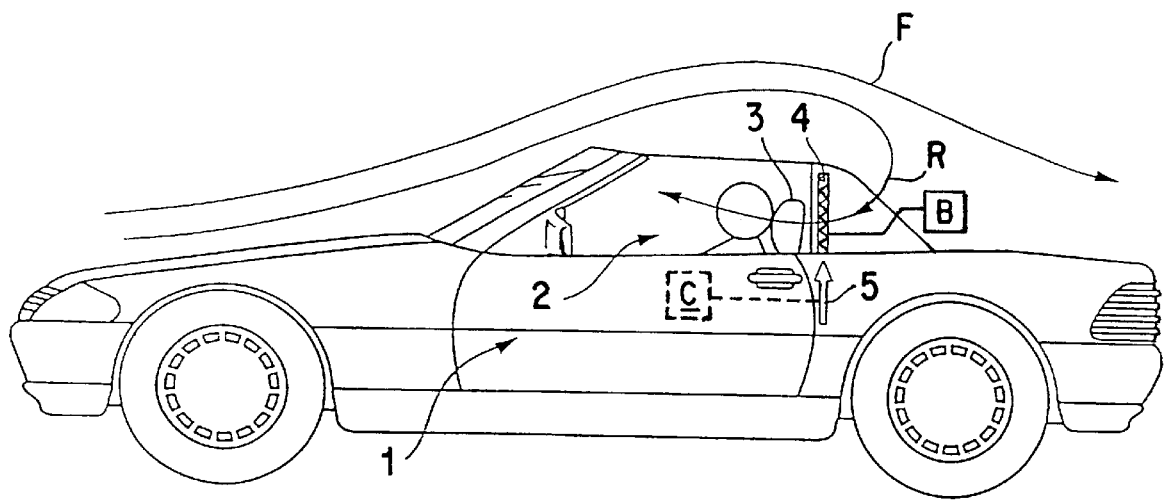
FIG. 1 is a schematic diagram of an open automobile provided with one embodiment of an anti-buffet screen device according to the invention.
Figure 2A:
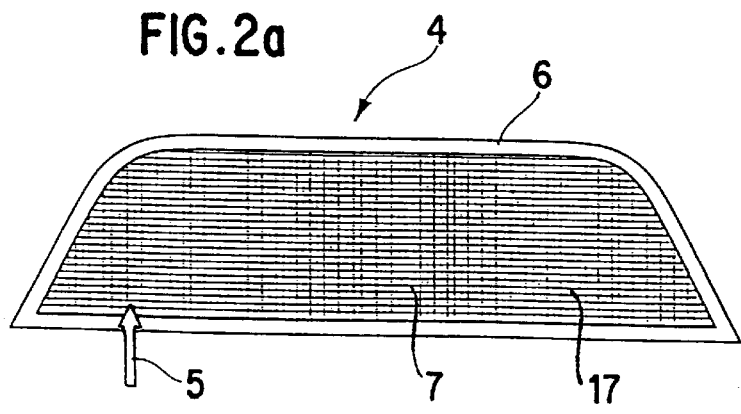
FIG. 2a is a schematic front view of the anti-buffet screen device in FIG. 1.
Figure 2B:
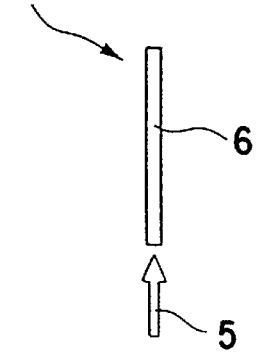

A convertible 1 according to FIG. 1 has an interior 2 that can be covered in a manner not shown by a folding top or by a hardtop design. With the top open or with the hardtop removed, a wind blast F is produced while convertible 1 is in motion. As a result of a suction effect, a reverse flow R derived from wind blast F is produced that flows through passenger compartment 2 in the direction of travel opposite to wind blast F. In order to reduce the draft phenomena caused by this reverse flow R in passenger compartment 2 and especially in the vicinity of the front-seat positions of passenger compartment 2, an anti-buffet screen 4 is located in passenger compartment 2, said screen extending across the entire width of passenger compartment 2. Anti-buffet screen 4 is located a short distance behind the headrests 3 of the driver and passenger seat positions and extends approximately vertically for the full height of passenger compartment 2. Anti-buffet screen 4 as shown in FIGS. 2a and 2b has a rigid frame 6 in which an air-permeable flat structure 7 is stretched. The net-like openings in flat structure 7 produce a throttling of reverse flow R and thus reduce the draft phenomena in passenger compartment 2 for the vehicle occupants who are seated on the driver and passenger sides.

In order to permit pleasant driving with the top down or with the hardtop removed, even at low outside temperatures, a radiator device in the form of an electrical woven structure of heating wires or a net is integrated into anti-buffet screen 4. The heating wire woven structure or net either forms flat structure 7 directly or is included in flat structure 7. The heating wire woven structure or net extends over the entire surface of flat structure 7 so that the effective surface of the radiator device corresponds to the effective surface of anti-buffet screen 4. A power supply 5 indicated by an arrow, especially in the form of a plug-in connection, creates a link between the electrical heating wire woven structure or net and the electrical on-board system present in convertible 1. The radiator device can be activated either by a switch or in simple fashion by plugging in the plug connector.

A schematically depicted additional blower B (FIG. 1) is included in certain preferred embodiments. This blower B is configured to generate flow moving in a direction of reverse flow produced during movement of the vehicle by the wind blast through the anti-buffet screen and the heat-transfer device.

A schematically depicted control C (FIG. 1) is provided according to certain preferred embodiments, for control of the heating or cooling power in dependence upon the vehicle driving speed.

In embodiments of the invention that are not shown, other radiator devices that are flat in shape or cooling heat-transfer devices are provided that operate with liquid heat-transfer media. Such heat-transfer devices can be made in the form of blocks with ribs and tubing, as plate or disk heat converters, or in the form of mats. A requirement for all the heat transfer devices according to the invention is the heat-transfer principle based on their being traversed by reverse flow R.

In the embodiment according to FIGS. 3a and 3b, an anti-buffet screen 8 is provided that has a structure of the conventional type composed of a frame and a flat structure stretched within this frame. A heat-transfer device 9 is mounted on this anti-buffet screen 8, said device being flat in shape and having an effective surface that corresponds to the active surface of anti-buffet screen 8. Heat-transfer device 9 is mounted parallel to anti-buffet screen 8 and connected thereto by fastening elements, not shown in greater detail. Heat-transfer device 9 can have an intrinsically rigid structure or can be designed as a flexible air-permeable woven structure composed of heating wires. The current is supplied through supply guide 10 in the design that uses an electrical woven structure composed of heating wires as described above, while for heat transfer by liquid circuits the supply guide 10 constitutes the inlet and outlet of the circuit. Heat-transfer device 9 can be located in front of or behind anti-buffet screen 8, depending on the direction in which reverse flow R flows through.

The embodiment in FIG. 4 has an anti-buffet screen 11 composed of a rigid frame 12 and an air-permeable flat structure stretched therein. A heat-transfer device 15 is also associated with anti-buffet screen 11, said device, according to the embodiments described above, either being integrated into anti-buffet screen 11 or being mounted parallel to anti-buffet screen 11. Heat-transfer device 15 has a connection 16 which, in the design that uses heat-transfer device 15, has a power supply as the electrical heating surface structure, while in the design of the heat-transfer device 15 in which it is part of a heat-transfer liquid circuit, the device has a corresponding connection to this circuit. The active surface of this heat-transfer device 15 is cut out at the level of headrest 3 on the driver and passenger sides to form openings 13 and 14 since effective through flow takes place only with difficulty at the level of headrests 3. As a result of this design, the energy cost of the heat-transfer system is reduced without the effective heat-transfer surfaces being significantly reduced.

In addition to homogenous heating of anti-buffet screens 4, 8, or 11, only zonewise heating or heating power that differs by zones and a temperature for anti-buffet screen 4, 8, 11 can be provided so that the specific flow conditions at the screens can be taken into account carefully and consideration can be given to the wishes of the occupants.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Anti-buffet screen device for an open motor vehicle with at least one anti-buffet screen associated with at least one seat position of a vehicle interior, wherein said anti-buffet screen has a heat-transfer device associated with it, said heat transfer device being flat in shape extending over a portion of an active surface of the anti-buffet screen.

2. Anti-buffet screen device according to claim 1, wherein the heat-transfer device is integrated in the anti-buffet screen.

3. Anti-buffet screen device according to claim 1, wherein the heat-transfer device is aligned parallel to the anti-buffet screen and is mounted thereon.

4. Anti-buffet screen device according to claim 1, wherein an effective area of the heat-transfer device is cut out in a vicinity of the headrests at each seat position.

5. Anti-buffet screen device according to claim 1, wherein the heat-transfer device has an additional blower associated with it, with the flow generated by said blower moving in a direction of reverse flow produced during movement of the vehicle by the wind blast through the anti-buffet screen and the heat-transfer device.

6. Anti-buffet screen device according to claim 1, wherein the heat transfer device is a radiator device comprising electrically heatable flat structures.

7. Anti-buffet screen device according to claim 1, wherein the heat-transfer device can be operated with liquid or gaseous heat transfer media in a heat-transfer circuit.

8. Anti-buffet screen device according to claim 1, wherein the heat-transfer device is associated with a control for the heating or cooling power that depends upon the driving speed.

9. Anti-buffet screen device according to claim 2, wherein an effective area of the heat-transfer device is cut out in a vicinity of the headrests at each seat position.

10. Anti-buffet screen device according to claim 3, wherein an effective area of the heat-transfer device is cut out in a vicinity of the headrests at each seat position.

11. Anti-buffet screen device according to claim 2, wherein the heat-transfer device has an additional blower associated with it, with the flow generated by said blower moving in a direction of reverse flow produced during movement of the vehicle by the wind blast through the anti-buffet screen and the heat-transfer device.

12. Anti-buffet screen device according to claim 3, wherein the heat-transfer device has an additional blower associated with it, with the flow generated by said blower moving in a direction of reverse flow produced during movement of the vehicle by the wind blast through the anti-buffet screen and the heat-transfer device.

13. Anti-buffet screen device according to claim 4, wherein the heat-transfer device has an additional blower associated with it, with the flow generated by said blower moving in a direction of reverse flow produced during movement of the vehicle by the wind blast through the anti-buffet screen and the heat-transfer device.

14. Anti-buffet screen device according to claim 9, wherein the heat-transfer device has an additional blower associated with it, with the flow generated by said blower moving in a direction of reverse flow produced during movement of the vehicle by the wind blast through the anti-buffet screen and the heat-transfer device.

15. Anti-buffet screen device according to claim 10, wherein the heat-transfer device has an additional blower associated with it, with the flow generated by said blower moving in a direction of reverse flow produced during movement of the vehicle by the wind blast through the anti-buffet screen and the heat-transfer device.

16. Anti-buffet screen device according to claim 2, wherein the heat transfer device is a radiator device comprising electrically heatable flat structures.

17. Anti-buffet screen device according to claim 3, wherein the heat transfer device is a radiator device comprising electrically heatable flat structures.

18. Anti-buffet screen device according to claim 4, wherein the heat transfer device is a radiator device comprising electrically heatable flat structures.

19. Anti-buffet screen device according to claim 5, wherein the heat transfer device is a radiator device comprising electrically heatable flat structures.

20. Anti-buffet screen device according to claim 2, wherein the heat-transfer device can be operated with liquid or gaseous heat transfer media in a heat-transfer circuit.

21. Anti-buffet screen device according to claim 3, wherein the heat-transfer device can be operated with liquid or gaseous heat transfer media in a heat-transfer circuit.

22. Anti-buffet screen device according to claim 4, wherein the heat-transfer device can be operated with liquid or gaseous heat transfer media in a heat-transfer circuit.

23. Anti-buffet screen device according to claim 5, wherein the heat-transfer device can be operated with liquid or gaseous heat transfer media in a heat-transfer circuit.

24. Anti-buffet screen device according to claim 6, wherein the heat-transfer device can be operated with liquid or gaseous heat transfer media in a heat-transfer circuit.

25. Anti-buffet screen device according to claim 2, wherein the heat-transfer device is associated with a control for the heating or cooling power that depends upon the driving speed.

26. Anti-buffet screen device according to claim 3, wherein the heat-transfer device is associated with a control for the heating or cooling power that depends upon the driving speed.

27. Anti-buffet screen device according to claim 4, wherein the heat-transfer device is associated with a control for the heating or cooling power that depends upon the driving speed.

28. Anti-buffet screen device according to claim 5, wherein the heat-transfer device is associated with a control for the heating or cooling power that depends upon the driving speed.

29. Anti-buffet screen device according to claim 6, wherein the heat-transfer device is associated with a control for the heating or cooling power that depends upon the driving speed.

30. Anti-buffet screen device according to claim 7, wherein the heat-transfer device is associated with a control for the heating or cooling power that depends upon the driving speed.

31. A method of making a buffet screen device assembly for an open motor vehicle comprising:

providing an anti-buffet screen disposable in use behind a seat position in an open motor vehicle, said screen having through openings for flow of air induced by movement of the vehicle, and providing a heat transfer device disposed in the same flow of air through the screen.

32. A method according to claim 31, wherein the heat-transfer device is integrated in the anti-buffet screen.

33. A method according to claim 31, wherein the heat-transfer device is aligned parallel to the anti-buffet screen and is mounted thereon.

34. A method according to claim 31, wherein an effective area of the heat-transfer device is cut out in a vicinity of the headrests at each seat position.

35. A method according to claim 31, wherein the heat transfer device is a radiator device comprising electrically heatable flat structures.

36. A method according to claim 31, wherein the heat-transfer device can be operated with liquid or gaseous heat transfer media in a heat-transfer circuit.

* * * * *